United States Patent
Kim et al.

(10) Patent No.: US 9,473,553 B2
(45) Date of Patent: Oct. 18, 2016

(54) METHOD FOR DISTRIBUTING AND CONTROLLING TRAFFIC IN CLOUD COMPUTING SYSTEM AND CLOUD COMPUTING SYSTEM USING THE SAME

(75) Inventors: Dong-Hoon Kim, Gyeonggi-do (KR); Ho-Hyun Jeon, Seoul (KR); Jae-Suk Ahn, Seoul (KR); Yoon-Bum Huh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 735 days.

(21) Appl. No.: 13/336,058

(22) Filed: Dec. 23, 2011

(65) Prior Publication Data

US 2012/0226733 A1 Sep. 6, 2012

(30) Foreign Application Priority Data

Dec. 23, 2010 (KR) ........................ 10-2010-0133732

(51) Int. Cl.
*G06F 15/16* (2006.01)
*H04L 29/08* (2006.01)
*G06F 15/173* (2006.01)
*G06F 9/50* (2006.01)

(52) U.S. Cl.
CPC ............ *H04L 67/00* (2013.01); *G06F 9/5083* (2013.01); *G06F 9/5072* (2013.01); *G06F 2209/5022* (2013.01)

(58) Field of Classification Search
CPC ............ G06F 9/5083; G06F 9/5072; G06F 2209/5022; H04L 67/00
USPC ............ 709/201, 217, 229, 232, 235, 239; 370/229
See application file for complete search history.

(56) References Cited

U.S. PATENT DOCUMENTS

| 5,313,454 | A | * | 5/1994 | Bustini | H04L 12/5602 |
| | | | | | 370/231 |
| 6,018,519 | A | * | 1/2000 | Ginzboorg | H04L 29/06 |
| | | | | | 370/236 |
| 7,640,292 | B1 | | 12/2009 | Smoot | |
| 8,493,847 | B1 | * | 7/2013 | Kondapalli | H04L 47/10 |
| | | | | | 370/229 |
| 2001/0042253 | A1 | | 11/2001 | Jung | |
| 2002/0083194 | A1 | | 6/2002 | Bak et al. | |
| 2005/0055402 | A1 | | 3/2005 | Sato | |
| 2005/0135235 | A1 | * | 6/2005 | Maruyama | H04L 1/22 |
| | | | | | 370/219 |
| 2005/0201302 | A1 | * | 9/2005 | Gaddis | H04L 45/02 |
| | | | | | 370/254 |

(Continued)

FOREIGN PATENT DOCUMENTS

JP 2002-368787 A 12/2002
JP 2009-116380 A 5/2009

(Continued)

*Primary Examiner* — David Lazaro
*Assistant Examiner* — Vitali Korobov
(74) *Attorney, Agent, or Firm* — IP Legal Services, LLC

(57) ABSTRACT

Method for distributing and controlling traffic in cloud computing system and cloud computing system using the same. The cloud computing system may include a plurality of local data centers located at different regions and a control center coupled to the plurality of local data centers through a network. The plurality of local data centers each may be configured to process packets from user equipments in order to provide a requested service. The control center may be configured to distribute packets transmitted to one local data center into at least one other local data centers based on at least one given factor when an amount of the packets to the one local data center exceeds a given threshold.

7 Claims, 4 Drawing Sheets

(56) References Cited

U.S. PATENT DOCUMENTS

| | | |
|---|---|---|
| 2006/0010176 A1 | 1/2006 | Armington |
| 2008/0010325 A1 | 1/2008 | Yamakawa |
| 2009/0037680 A1 | 2/2009 | Colbert et al. |
| 2010/0128598 A1* | 5/2010 | Gandhewar ......... H04L 67/2814 370/217 |
| 2010/0153674 A1 | 6/2010 | Park et al. |
| 2010/0232594 A1 | 9/2010 | Lawson et al. |
| 2012/0044828 A1* | 2/2012 | Seo ................... H04B 7/15521 370/252 |
| 2012/0195204 A1* | 8/2012 | Patel ....................... H04L 45/00 370/237 |

FOREIGN PATENT DOCUMENTS

| | | |
|---|---|---|
| KR | 10-2001-0066370 A | 7/2001 |
| KR | 10-2002-0035181 A | 5/2002 |
| KR | 10-2008-0079119 A | 8/2008 |
| KR | 10-2008-0079120 A | 8/2008 |
| KR | 10-2009-0063122 A | 6/2009 |
| KR | 10-2009-0065126 A | 6/2009 |
| KR | 10-2010-0069968 A | 6/2010 |
| KR | 10-2010-0073155 A | 7/2010 |
| KR | 10-2010-0092850 A | 8/2010 |
| KR | 10-2010-0107113 A | 10/2010 |
| KR | 10-2010-0121209 A | 11/2010 |

* cited by examiner

METHOD FOR DISTRIBUTING AND CONTROLLING TRAFFIC IN CLOUD COMPUTING SYSTEM AND CLOUD COMPUTING SYSTEM USING THE SAME

CROSS REFERENCE TO PRIOR APPLICATIONS

The present application claims priority under 35 U.S.C. §119 to Korean Patent Application No. 10-2010-0133732 (filed on Dec. 23, 2010), which is hereby incorporated by reference in its entirety.

FIELD OF THE INVENTION

Apparatuses and methods consistent with the present invention relate to a method for distributing and controlling data traffic in a cloud computing system and a cloud computing system using the same, and more particularly, a cloud computing system including a plurality of local data centers and a control center controlling the local data centers, and a traffic distributing method of a local data server and a control method of a control center in the cloud computing system.

BACKGROUND OF THE INVENTION

A typical computing environment uses computing resources belonging to individual computing hardware in order to provide services to user equipments. With the development of computer network technology, such a typical computing environment has evolved into a cloud computing environment. Cloud computing may provide relevant services using available computing resources distributed over a network without end-user knowledge of physical location and configuration of respective computing resources that deliver the services.

A cloud computing service may provide an on-demand outsourced service of computing resources through an information telecommunication network such as the Internet. In a cloud computing environment, a service provider may virtually consolidate data centers distributed over a network to provide necessary services to end-users. In the cloud computing service, a user may be not required to buy or install computing resources including applications, storages, operating systems (OS), and/or security software in a user equipment. Instead, a user may select and simply use virtualized computing resources whenever a user wants.

In order to provide such a cloud computing service, data centers may be constructed through virtualizing respective computing resources distributed over a network. Furthermore, such data centers may be required to be dynamically expanded according to service demands of users, such as the number of accessed user equipments or an amount of data traffic generated for providing a requested service.

Typical scale-out technology has been employed to expand virtualized computing resources of data centers in response to the abrupt increment of service demands. Such scale-out technology may horizontally expend processing capability by simply adding computing resources such as a virtual machine capable of processing requested services.

The typical scale-out technology, however, is not reflected with the cloud computing environment where computing resources of the data centers are physically distributed over a network. Accordingly, there is a need for improving a cloud computing technology to efficiently and dynamically managing and controlling computing resources distributed over the network according to service demands.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a cloud computing system may include a plurality of local data centers and a control center controlling the local data centers. When an amount of data traffic inflowing from one data traffic source region into one local data center exceeds a given threshold, the cloud computing system may distribute the data traffic to at least one other local data center based on at least one given factors.

In accordance with an embodiment of the present invention, a cloud computing system includes a plurality of local data centers located at different regions and a control center coupled to the plurality of local data centers through a network. The plurality of local data centers each may be configured to process packets from user equipments in order to provide a requested service. The control center may be configured to distribute packets transmitted to one local data center into at least one other local data centers based on at least one given factor when an amount of the packets to the one local data center exceeds a given threshold.

The at least one given factor may be a location of a local data center. In this case, the packets to the one local data center may be transmitted from a first source region and the at least one other local data centers may be located at the first source region.

The at least one given factor may be a time zone of a source region where the user equipments are located. In this case, the one local data center may be located in a first source region and the at least one other local data center may be located in a second source region having a time zone different from a time zone of the first source region.

The plurality of local data centers, each may include at least one virtual machine and a monitoring module. The at least one virtual machine may be configured to process the packets in order to provide a requested service to the user equipments. At least one virtual machine may be virtualized computing resources. The monitoring module may be configured to calculate the amount of packets incoming from each source region where respective user equipments are located in and monitor the amount of packets from the each source region to determine whether the amount of packets from each source region exceeds a given threshold.

The monitoring module may be configured to determine a source region transmitting the excessive amount of packets as a heavy data traffic source region and transmit a distribution request to the control center. In this case, the control center may be configured to search for a local data center to distribute the packets as a target local data center based on the at least one given factor in response to the distribution request and transmit a preparation request to the searched local data center.

The control center may be configured to transmit a virtual machine image to the searched local data center together with the preparation request. The searched local data center may create a virtual machine for processing the packets and transmit a preparation completion message to the control center.

The control center may be configured to command the one local data center to forward the packets to the at least one other local data center in response to the preparation completion message.

In accordance with another embodiment of the present invention, a method may be provided for distributing data traffic in a cloud computing system including a plurality of local data centers located in different regions and a control center coupled to the plurality of local data centers through a network, the method including: monitoring packets incoming from a plurality of source regions; requesting the control center to distribute packets when an amount of packets from one source region to one local data center exceeds a given threshold; searching for at least one other local data centers based on at least one given factor; distributing the packets, which are transmitted from the one source region to the one local data center, to the at least one other local data centers based on the search result.

The monitoring packets may include: determining the plurality of source regions where packets are transmitted from; calculating an amount of packets incoming from each one of the plurality of source regions to one local data center; determining one source region as a heavy data traffic source region when the calculated amount of packets from the one source region exceeds the given threshold; and transmitting a distribution request to the control center in order to request the control center to distribute packets.

The plurality of source regions may be determined based on a transmitter IP address of a respective packet.

The at least one given factor may be a location of a local data center. In this case, the at least one other local data centers located in the heavy data source region may be searched as a target local data center to distribute packets.

The at least one given factor may be a time zone of a source region where the user equipments are located. In this case, the at least one other local data centers located in a source region having a different time zone compared to the one local data center may be searched.

The distributing the packets may include: migrating a virtual machine in the one local data center to at least one other local data center when the packets from the heavy data-traffic region is for providing a service to a user equipment already accessed the one local data center; and forwarding the packets from the heavy data-traffic region to the at least one other local data center after the completion of the migration.

The distributing the packets may include: forwarding packets to the at least one other local data center when the packets from the heavy data traffic source region are for providing a related service to a user equipment newly access the at least one other local data center.

The control center may command the at least one other local data center to prepare processing packets inflowing into the one local data center in response to the distribution request, and command the one local data center to forward packets to the at least one other local data center after the completion of the preparation.

In accordance with still another embodiment of the present invention, a method may be provided for controlling a cloud computing system including a plurality of local data centers located in different regions and a control center of controlling the plurality of local data centers, the method including: receiving a distribution request from one local data center to distribute packets; searching for at least one other local data centers based on at least one given factor; transmitting a preparation command to the at least one other local data center to prepare processing packets inflowing into the one local data center in response to the distribution request; transmitting a distribution command to the one local data center to forward packets to the at least one other local data center upon receiving a preparation completion message from the at least one other local data center in response to the preparation command.

The at least one other local data centers located in a heavy data source region may be searched as a target local data center to distribute packets when the at least one given factor is a location of a local data center. The heavy data source region may be a source region transmitting an amount of packets exceeding a give threshold. The at least one other local data centers in a source region having a time zone different from a time zone of the one local data center may be searched when the at least one given factor is a time zone of a source region where the user equipments are located.

The one local data center may transmit the distribution request when an amount of packets inflowing from one source region exceeds a given threshold, and the one source region is determined as the heavy data traffic region.

The distribution command may include a virtual machine image that processes packets inflowing into the one local data center. The at least one other local data center may create a virtual machine based on the virtual machine image in order to process packets forwarded from the one local data center.

The one local data center may forward packets to the at least one other local data center when the one local data center receives the distribution request.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Hereinafter, a cloud computing system in accordance with an embodiment of the present invention will be described with reference to the accompanying drawings.

Figure 1:
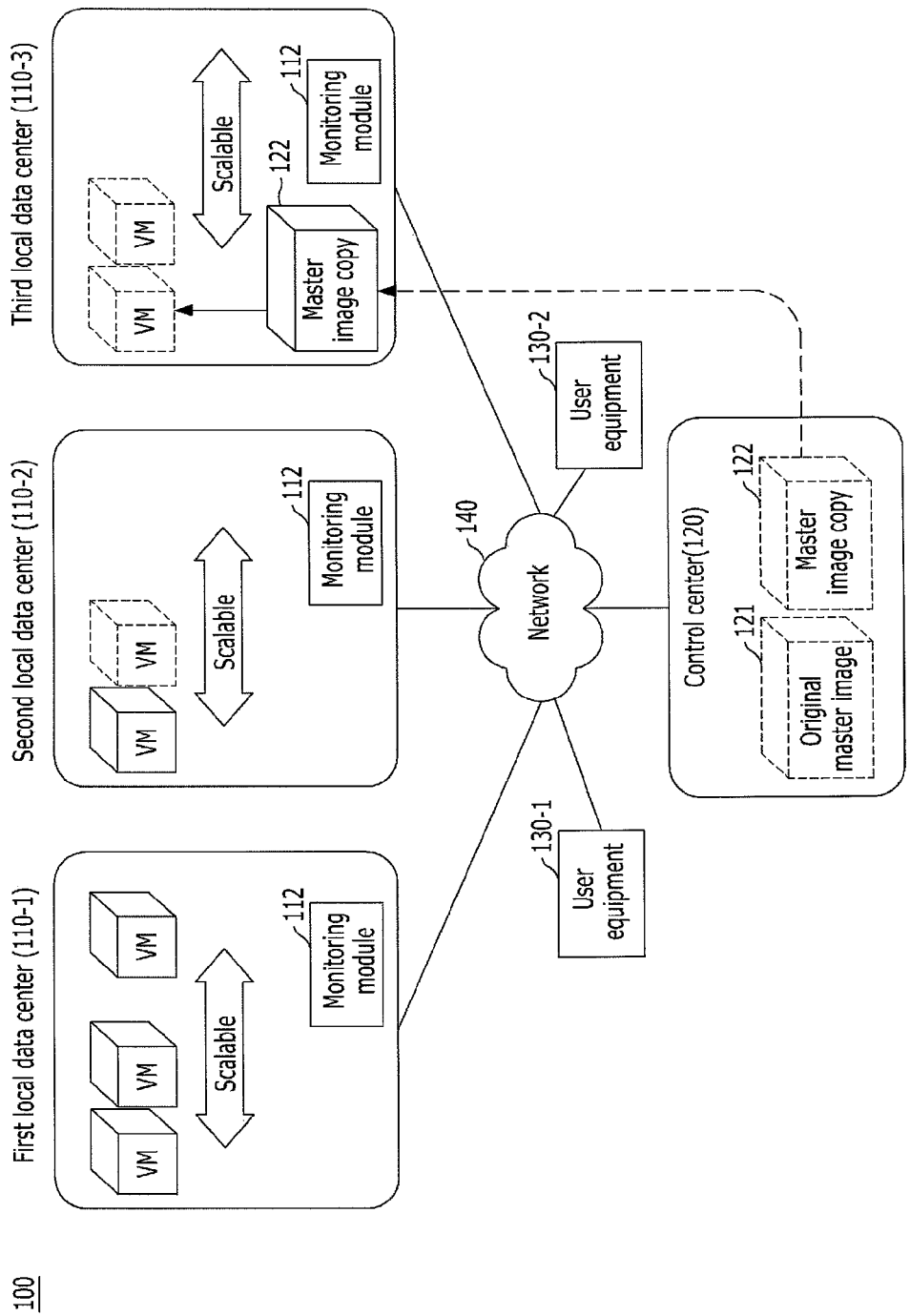
FIG. 1 illustrates a cloud computing system in accordance with an embodiment of the present invention.

FIG. 1 illustrates a cloud computing system in accordance with an embodiment of the present invention.

Referring to FIG. 1, a cloud computing system 100 may distribute excessive data traffic of one local data center to at least one other local data center according to a certain condition. In accordance with an embodiment of the present invention, the cloud computing system 100 may include a plurality of local data centers 110-1 to 110-3 and a control center 120 for controlling the local data centers 110-1 to 110-3.

The local data centers 110-1 to 110-3 may be distributed over different regions. The local data centers 110-1 to 110-3 may be coupled to each other through a network 140. Each one of the local data centers 110-1 to 110-3 may provide various types of services to user equipments 130-1 and 130-2 through the network 140. The user equipments 130-1 and 130-2 may be located in different regions. In order to provide a service to the user equipments 130-1 and 130-2, the local data centers 110-1 to 110-3 may receive a plurality of packets from the user equipments 130-1 and 130-2, process the received packets, and transmit respective packets as a processing result to the user equipments 130-1 and 130-2.

Each one of the local data centers 110-1 to 110-3 may include at least one virtual machine 111 and a monitoring module 112.

The virtual machine 111 may be virtualized physical computing resources. The local data centers 110-1 to 110-3 may use such virtual machine 111 to provide services to user equipments 130-1 and 130-2.

The monitoring module 112 may monitor data traffic and a connection state of a respective local data center. The monitoring module 112 may calculate an amount of data traffic transmitted from each data traffic source region.

The control center 120 may be coupled to the plurality of local data centers 110-1 to 110-3 through the network 140. The control center 120 may control data traffic flows into the plurality of local data centers 110-1 to 110-3 based on various factors. The factors may include a time zone of each data traffic source region, a location of a respective local data center, a data transmit rate of a respective network, a distance between a local data center and a corresponding user equipment, a processing capability of respective local data center, and a network latency of a respective network. The present invention, however, is not limited thereto. For example, when excessive data traffic is detected at a certain local data center, the control center 120 may distribute the excessive data traffic through at least one local data center in different time zones. For another example, when excessive data traffic is transmitted from one heavy data traffic source region to one local data center, the control center 120 may distribute the excessive data traffic of the one local data center to at least one other local data center located near to or in the heavy data traffic source region.

The control center 120 may manage an original master image 121 for creating the virtual machine 111. The control center 120 may transmit a master image copy 122 to one of the plurality of local data centers, which does not have a master image, in order to assist a respective local data center to be prepared for providing a related service to user equipments 130-1 and 130-2.

Each one of the local data centers 110-1 to 110-3 may receive the master image copy 122 from the control center 120 and create the virtual machine 111 based on the received master image copy 122. Meaning, the local data centers 110-1 to 110-3 may scale out the virtual machine 111 or create new virtual machines according to a service demand of related user equipments. One of local data centers may not have a master image copy 112. For example, the third local data center 110-3 does not have a master image copy 112 because the local data center 110-3 currently does not provide a related service to user equipments. In this case, the local data center 110-3 does not create a virtual machine before any service requests are received from a user equipment. When the local data center 110-3 needs to provide a related service to user equipments upon a certain event, the local data center 110-3 may be provided with the master image copy 112 by the control center 120. Based on the provided master image copy 112, the local data center 110-3 may create a virtual machine and provide related service to user equipments 130-1 and 130-2. The certain event may be excessive data traffic inflowing into a respective local data center from a certain region.

As described above, the cloud computing system in accordance with an embodiment of the present invention may distribute excessive data traffic, which is transmitted from a heavy data traffic source region to one local data center, to at least one other local data centers locally close to or in the heavy data-traffic source region.

Particularly, when a monitoring module 112 monitors excessive data traffic inflowing into a corresponding local data center 110-1 from a specific data traffic source region, the monitoring module 112 may informs the corresponding local data center 110-1 of the excessive data traffic. Such a specific data traffic source region may be referred to as a heavy data traffic source region. The local data center 110-1 may request the control center 120 to distribute the inflowing data traffic. In response to the request, the control center 120 may find at least one local data center based on a given factor, for example, a location of a local data center. The present invention, however, is not limited thereto. The factors may be at least one of a time zone of each data traffic source region, a location of a respective local data center, a data transmit rate of a respective network, a distance between a local data center and a corresponding user equipment, a processing capability of respective local data center, and a network latency of a respective network. When the given factor is the location of the local data center, the control center 120 may search for at least one local data center 110-2 located near to or in the heavy data traffic source region, as a target local data center. The control center 120 may transmit a preparation request to the target local data center 110-2 to prepare for providing requested services. The control center 120 may transmit a master image copy to the target local data center. After the completion of preparation, the target local data center 110-2 may transmit a preparation completion message to the control center 120. Upon the receipt of the preparation completion message, the control center 120 may redirect packets from the respective data-traffic source region to the target local data center 110-2, which is located in the respective data-traffic source region.

As described above, the cloud computing system may dynamically manage and control processing loads of local data centers in response to service demand that varies according to various network environmental factors. In this manner, the cloud computing system 100 may effectively and dynamically balance data traffic flows even when service demands abruptly increases. Furthermore, the cloud computing system may reduce response time and network latency in processing the data traffic, thereby improving overall service qualities.

Particularly, the cloud computing system may efficiently manage data traffic when a plurality of local data centers are distributed over regions in different time zones. For example, the cloud computing system may provide contents-sharing services to a plurality of user equipments located in different time zones. Since the contents-sharing services are provided mainly during a daytime, a local data center in a daytime zone may easily have excessive data traffic for providing such contents-sharing services. In this case, the excessive data traffic for the contents-sharing services may be distributed from one local data center to at least one other local data centers in different time zones. In this manner, the cloud computing system may effectively distribute a large amount of data traffic through a plurality of local data centers located in different time zones.

Figure 2:
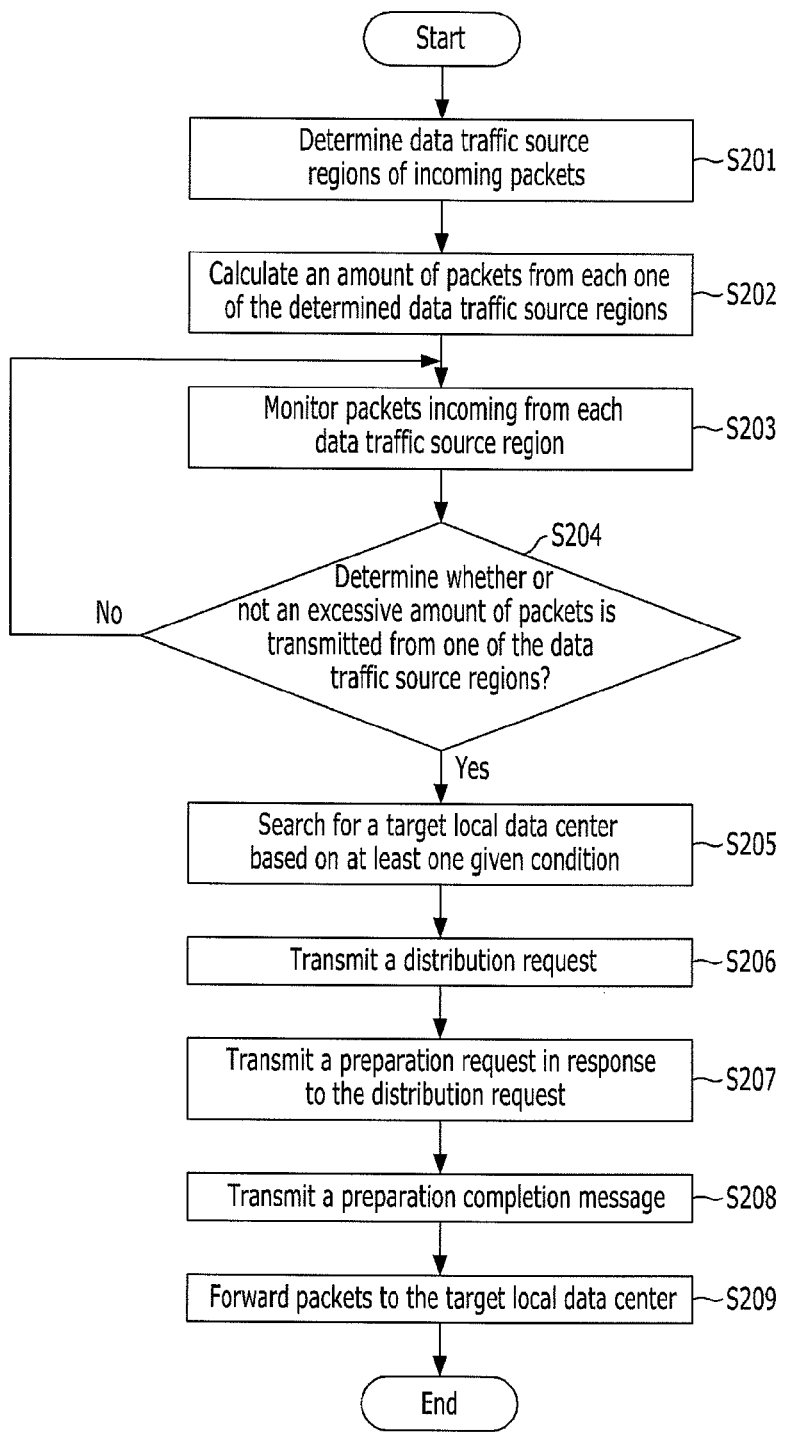
FIG. 2 illustrates a method for distributing data traffic in a cloud computing system, in accordance with an embodiment of the present invention.

FIG. 2 illustrates a method for distributing data traffic in a cloud computing system, in accordance with an embodiment of the present invention.

For convenience and ease of understating, a method for distributing data traffic will be described as that excessive data traffic inflows into a first local data center and the excessive data traffic is distributed from the first local data center to a second local data center. The present invention, however, is not limited thereto.

Referring to FIG. 2, data-traffic source regions of incoming packets may be determined based on a transmitter IP address of each packet S201. The data-traffic source region may denote a source region where packets are transmitted from in order to provide a related service to user equipments. For example, the monitoring module 112 of the first local data center 110-1 may determine data-traffic source regions of incoming packets. The monitoring module 112 may check a transmitter IP address included in each incoming packet to detect the data-traffic source regions of incoming packets.

An amount of packets incoming from each one of the determined data-traffic source regions may be calculated S202. For example, the monitoring module 112 may calculate an amount of packets incoming from each one of the determined data-traffic source regions.

Packets incoming from each data traffic source region may be monitored based on the calculated amount of data traffic S203. For example, the monitoring module 112 may monitor an amount of data traffic informing from each transmission source region.

A determination may be made as to whether or not an excessive amount of packets is transmitted from one of the determined data traffic source regions based on the monitoring result S204. For example, the monitoring module 211 may determine whether or not an excessive amount of data traffic is received from one of the determined data traffic source regions based on the calculated data traffic amount and the monitoring result. When an amount of packets incoming from a certain data-traffic source region exceeds a given threshold value based on the monitoring result, the monitoring module 211 may determine the respective data-traffic source region as the heavy data traffic source region.

When the heavy data traffic source region is detected based on the monitoring result (S204—Yes), at least one target local data center to distribute data traffic may be searched for based on at least one given factor S205. For example, the given factor may be a location of a local data center. That is, a local data center locally closer to or in the heavy data traffic source region may be searched for. However, the present invention is not limited thereto. The given factor may be a time zone of a local data center and/or a data transmit rate of a respective network. For example, when a second region is determined as the heavy data traffic source region, the monitoring module 112 of the first local data center 110-1 may request the control center 120 to search for a local data center located in the second region. The control center 120 may search for a local data center located near to or in the second region in response to the request from the first local data center 110-1 and inform the first local data center 110-1 of the search result. For example, the control center 120 may inform the first local data center 110-1 that the second local data center 110-2 is located in the second region.

Based on the search result, a distribution request may be transmitted to the control center S206. For example, after the second local data center is determined as a local data center located in the heavy data traffic source region, the first local data center 110-1 may transmit a distribution request to the control center 120.

In response to the distribution request, a preparation request may be transmitted to the second local data center S207. For example, the control center 120 may transmit a preparation request to the second local data center located in the second region which is determined as the heavy data traffic source region.

In response to the preparation request, a preparation process may be performed by the target local data center S208. For example, the second local data center 110-2 located in the heavy data traffic source region may perform a preparation process for processing data traffic transmitted from the heavy data traffic source region in order to provide a related service to user equipments in the heavy data traffic source region. As a preparation process, the second local data center 110-2 may create a virtual machine based on a master image copy 122. When the second local data center 110-2 does not have the master image copy 122, the second local data center 110-2 may request the master image copy 122 to the control center 120. In response to the request, the control center 120 may transmit the master image copy 122 to the control center 120.

A preparation completion message may be transmitted to the control center 120 S208. For example, after the completion of the preparation process, the second local data center 110-2 may transmit the preparation completion message to the control center 120.

Upon the receipt of the preparation completion message, data traffic transmitted from the heavy data traffic source region may be forwarded to the target local data center S209. For example, the control center 120 may receive the preparation completion message from the second local data center 110-2. Upon the receipt of the preparation completion message, the control center 120 may perform a distribution process for forwarding packets incoming from the heavy data traffic source region to the second local data center 110-2.

There may be various methods for forwarding the data traffic to the second local data center 110-2. For example, the data traffic may be forwarded to a local data center in the heavy data traffic region according to a type of each packet incoming from the heavy data traffic region.

When an incoming packet is from a user equipment already accessed to the first local data center for receiving a related service from a virtual machine in the first local data center 110-1, the control center 120 may first migrate the virtual machine of the first local data center 110-1 to the second local data center. After the completion of the migration, the control center 120 may forward packets incoming from the heavy data traffic source region to the second local data center 110-2.

When an incoming packet is from a user equipment that is located in the heavy data traffic source region and newly accesses the cloud computing system 100 for receiving a related service, the control center 120 may forward packets to the second local data center 110-2 without migration.

As described above, packets may be forwarded differently according to the types thereof. However, the present invention is not limited thereto. Data traffic may be forwarded according to a service type provided by each virtual machine in a respective local data center.

Figure 3:
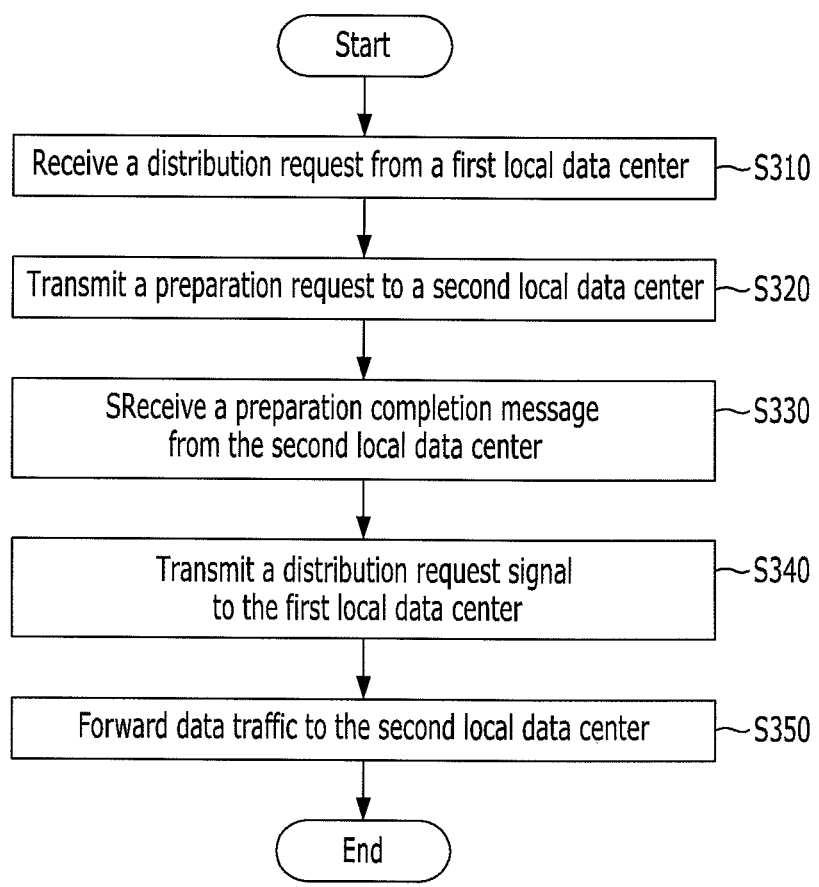
FIG. 3 illustrates a method for controlling a plurality of local data centers at a control center in a cloud computing system, in accordance with an embodiment of the present invention.

FIG. 3 illustrates a method for controlling a plurality of local data centers at a control center in a cloud computing system, in accordance with an embodiment of the present invention.

For convenience and easy of understanding, a method for controlling a plurality of local data centers will be described as that a control center 120 controls first and second local data centers 110-1 and 110-2 located in first and second regions respectively, and the first local data center 110-1 receives excessive data traffic transmitted from a second region.

Referring to FIG. 3, a distribution request may be received from a first local data center S310. For example, the control center 120 may receive a distribution request from the first local data center 110-1. The distribution request may be a request for distributing data traffic from the first local data center 101-1 to the second local data center 101-2. Particularly, when the first local data center receives excessive amount of data traffic from the second region, the first local data center may transmit the distribution request to the control center 120.

In response to the distribution request, a preparation request may be transmitted to the second local data center 110-2 S320. For example, upon the receipt of the distribution request, the control center 120 may transmit a preparation request to the second local data center 110-2. The control center 120 may select the second local data center 110-2 because the second local data center 110-2 is in the second region which may be determined as a heavy data traffic source region. However, the present invention is not limited thereto. In another embodiment of the present invention, the control center 120 may select a local data center located in a region having a different time zone, as compared to a time zone of the first local data center. That is, various factors may be considered to select a local data center to distribute data traffic of the first local data center. The various factors may include a time zone of each data traffic source region, a location of a respective local data center, a data transmit rate of a respective network, a distance between a local data center and a corresponding user equipment, a processing capability of respective local data center, and a network latency of a respective network.

Furthermore, the preparation request may include a command for creating a virtual machine that can process packets inflowing to the first local data center 110-1. The virtual machine image may be a master image copy 122. Furthermore, the control center 120 may inquire the second local data center 110-2 whether the virtual machine image is stored in the second local data center 110-2 or not. According to the response from the second local data center 110-2, the control center may transmit the virtual machine image to the second local data center 110-2. In response to the command, the second local data center 110-2 may create a virtual machine for processing packets to be forwarded to the second local data center 110-2 from the first local data center 110-1.

A preparation completion message may be received from the second local data center 110-2 S330. For example, the control center 120 may receive a preparation completion message from the second local data center 110-2 when the second local data center 110-2 is ready for receiving data traffic of the first local data center 110-1.

A distribution request signal may be transmitted to the first local data center 110-1 in response to the preparation completion message S340. For example, the control center 120 may transmit a distribution request signal to the first local data center 110-1 in response to the preparation completion message from the second local data center 110-2. The first local data center 110-1 may migrate a respective virtual machine to the second local center 110-2 when the incoming packets are from a user equipment already accessed the first local data center 110-1 for receiving a respective service. In this manner, the second local data center 110-2 may continually process packets of the respective service that currently is providing to respective user equipments.

Data traffic may be forwarded to the second local data center 110-2 S350. Under the control of the control center 120, the data traffic to the first local data center 110-1 may be forwarded to the second local data center 110-2. Accordingly, the first local data center may forward packets incoming from the second region, which is determined as the heavy data traffic region, to the second local data center 110-2 located in the second region.

Figure 4:
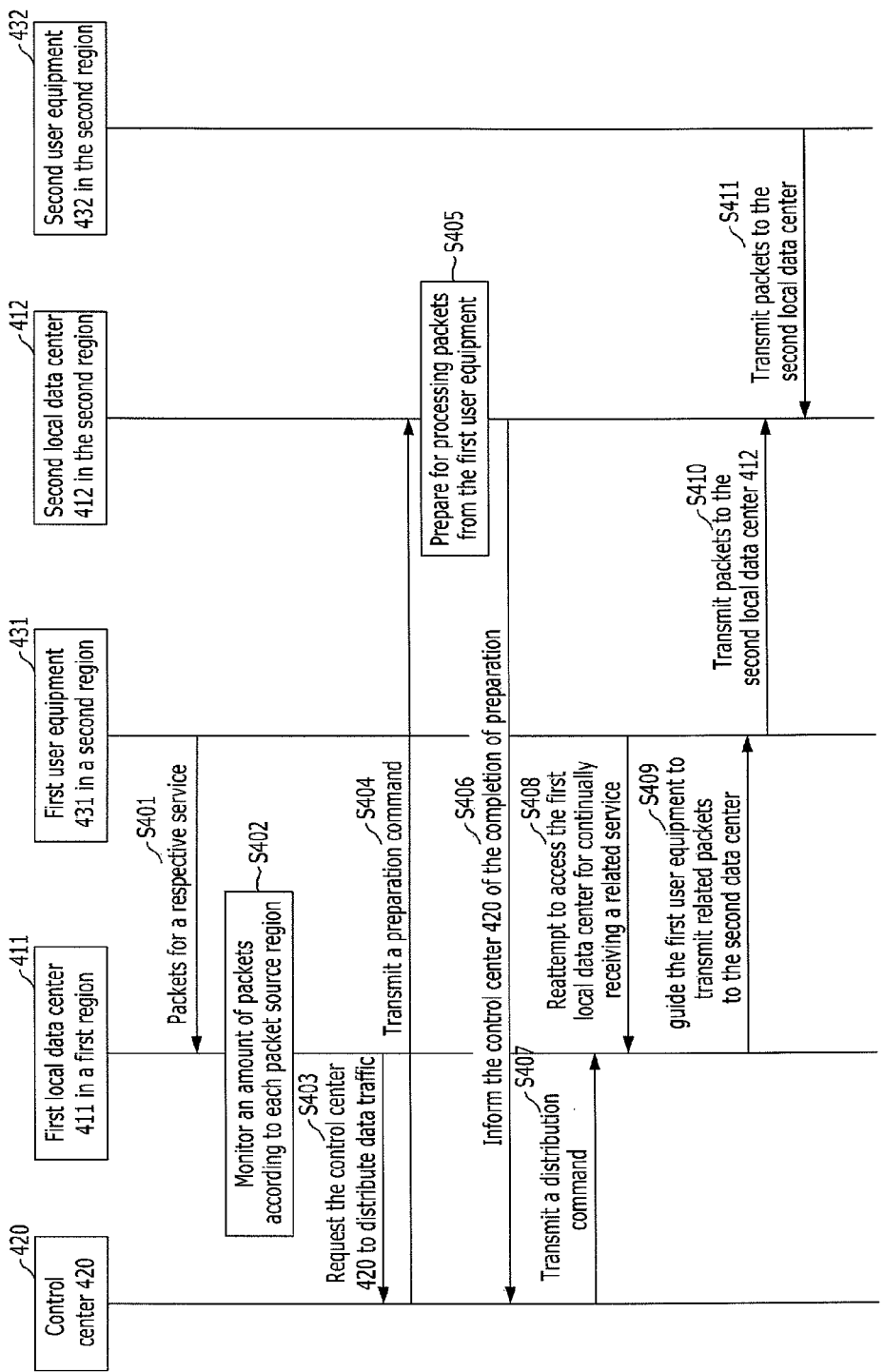
FIG. 4 illustrates a method for distributing data traffic from one local data center to at least one other local data center, in accordance with another embodiment of the present invention.

FIG. 4 illustrates a method for distributing data traffic from one local data center to at least one other local data center, in accordance with another embodiment of the present invention.

For convenience and ease of understanding, the method for distributing data traffic will be described as that excessive data traffic is generated by a first user equipment 431 in a second region, a first local data center 411 is located in a first region, and a second data center 412 is located in the second region. Hereinafter, the method for distributing such excessive service traffic of FIG. 4 will be described as an example of the method for distributing data traffic in accordance with an embodiment of the present invention.

Referring to FIG. 4, packets may inflow into the first local data center 411 in the first region from the first user equipment 431 in the second region S401. The first region may be separated from the second region. The first local data center 411 may monitor an amount of packets from each data traffic source region S402. When the amount of packets from the second region exceeds a certain threshold based on the monitoring result, the second region may be determined as a heavy data traffic source region and the first local data center 411 may request the control center 420 to distribute packets from the first user equipment 431 in the second region into a local data center located near to or in the second region S403.

In response to the distribution request from the first local data center 411, the control center 420 may transmit a preparation command to the second data center 412 located near to or in the second region to prepare a virtual machine for processing packets from the first user equipment 431 in the second region S404.

Herein, a virtual machine image for corresponding data traffic may be transmitted together with the preparation command when the control center 420 has the virtual machine image and the second local data center 412 does not have a virtual machine image. The virtual machine image may be a master image copy.

The second local data center 412 located in the second region may scale out an existing virtual machine or create a new virtual machine for processing the packets from the first user equipment 431 S405.

After the completion of preparation, the second local data center 412 may inform the control center 420 of the completion of preparation S406.

Upon the inform of preparation completion, the control center 420 may transmit a distribution command to the first local data center 411 at the first region in order to distribute the data traffic from the second region to the second local data center 412 located at the second region S407.

When the first user equipment 431 reattempts to access the first local data center to continually receive a relative service through the first local data center 411 in the first region S408, the first local data center 411 may guide the first user equipment 431 to forward corresponding packets to the second local data center 412 at the second region S409. Accordingly, the packets of the first user terminal 431 may be forwarded to the second local data center 412 located at the second region S410.

Also, packets from a second user equipment 432 located in the second region may be directly routed to the second local data center 412 at the region B S411.

As described above, the cloud computing system in accordance with an embodiment of the present invention may efficiently distribute excessive data traffic of one local data center to at least one other local data centers based on various given factors. Accordingly, the cloud computing system 100 may effectively and dynamically balance data traffic flows according to service demands of user equipments distributed in different regions. Furthermore, the cloud computing system may provide a stable service environment for a plurality of user equipments distributed in different regions by distributing and balancing data traffic. Therefore, overall service quality of the cloud computing system may be improved.

The invention may also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion. Also, functional programs, codes, and code segments for accomplishing the present invention may be easily construed by programmers skilled in the art to which the present invention pertains.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of distributing data traffic in a cloud computing system including a plurality of local data centers distributed over different regions and a control center coupled to the plurality of local data centers through a network, the method comprising:
   detecting, by a first local data center, a heavy data traffic source region transmitting packets exceeding a given threshold among source regions where packets are transmitted from;
   requesting, by the first local data center, the control center to distribute packets from the detected heavy data traffic source region;
   searching, by the control center, for a second local data center associated with the detected heavy data traffic source region based on at least one given factor;
   transmitting, by the control center, a preparation command to the second local data center such that the second local data center performs a preparation procedure for processing packets inflowing into the first local data center;
   transmitting, by the control center, a distribution command to the first local data center when a preparation completion message is received in response to the preparation command from the second local data center; and
   distributing, by the first local data center, the packets, which are transmitted from the detected heavy data traffic source region, to the second local data center, according to the distribution command,
   wherein the detecting includes:
   determining whether each of the source regions is the heavy data traffic source region, based on an amount of data traffic inflowing from each of the source regions.

2. The method of claim 1, wherein the detecting comprises:
   determining, by the first local data center, the source regions where packets are transmitted from, wherein at least one of user equipments is located in each of the source regions and transmits packets to the first local data center;
   calculating, by the first local data center, an amount of packets incoming from each one of the determined source regions to the first local data center; and
   determining, by the first local data center, one source region as a heavy data traffic source region when the calculated amount of packets from the one source region exceeds the given threshold.

3. The method of claim 2, wherein the source regions are determined based on a transmitter IP address of a respective packet.

4. The method of claim 1, wherein:
   the at least one given factor is a location of a local data center; and
   a local data center located comparatively close to or in the heavy data traffic source region is searched as the second local data center to distribute the packets.

5. The method of claim 1, wherein:
   the at least one given factor is a time zone of a source region; and
   a local data center located in a source region having a different time zone compared to the first local data center is searched as the second local data center to distribute the packets.

6. The method of claim 1, wherein the distributing the packets comprises:
   migrating a virtual machine in the first local data center to the second local data center when the packets inflowing from the detected heavy data traffic source region are associated with a service being already provided to a user equipment through the virtual machine of the first local data center; and
   forwarding the packets from the heavy data traffic source region to the second local data center after the completion of the migration.

7. The method of claim 1, wherein the distributing the packets comprises:

forwarding packets to the second local data center when the packets from the heavy data traffic source region are for providing a related service to a user equipment newly access the second local data center.

* * * * *